United States Patent [19]

Kremer et al.

[11] Patent Number: 4,615,869

[45] Date of Patent: Oct. 7, 1986

[54] ORE BENEFICIATION PROCESS

[75] Inventors: Ross A. Kremer, Ringoes; Stephen W. Saunders, Plainsboro, both of N.J.

[73] Assignee: Mobil Oil Corporation, New York, N.Y.

[21] Appl. No.: 747,692

[22] Filed: Jun. 24, 1985

Related U.S. Application Data

[63] Continuation of Ser. No. 545,553, Oct. 26, 1983, abandoned.

[51] Int. Cl.[4] .......................... C01F 1/00; C01F 5/00; B03B 1/00; B03D 3/00

[52] U.S. Cl. .................................. 423/167; 423/319; 209/3; 209/5; 209/164; 209/166; 501/146; 501/148

[58] Field of Search ........... 423/167, 319, 320, 321 R; 210/705, 702, 724, 907; 209/3, 5, 10, 164–167; 501/148, 146

[56] References Cited

U.S. PATENT DOCUMENTS

| | | | |
|---|---|---|---|
| 3,302,785 | 2/1967 | Greene | 209/5 |
| 3,450,633 | 6/1969 | Siemers | 423/167 X |
| 3,462,016 | 8/1969 | Bushell et al. | 209/166 |
| 3,493,340 | 2/1970 | Bosen et al. | 210/702 |
| 3,816,305 | 6/1974 | Schutte | 210/42 |
| 4,042,666 | 8/1977 | Rice | 423/167 |
| 4,049,547 | 10/1984 | Hamer et al. | 210/907 |

OTHER PUBLICATIONS

Chemical & Physical Beneficiation of Florida, Phosphate Slimes–Gary et al, Bureau of Mines, Report of Investigations, 6163, pp. 21, 22 (dtd 1963).

*Primary Examiner*—Gregory A. Heller
*Attorney, Agent, or Firm*—Alexander J. McKillop; Michael G. Gilman; Van D. Harrison, Jr.

[57] ABSTRACT

Phosphatic clay dispersions are modified by dispersing the phosphate matrix containing the clay in a dilute solution of selected acids prior to screening, sizing and other beneficiation operations.

8 Claims, 3 Drawing Figures

ORE BENEFICIATION PROCESS

This is a continuation of copending application Ser. No. 545,553, filed on Oct. 26, 1983, now abandoned.

NATURE OF THE INVENTION

This invention relates to treatment of ores, particularly phosphate ore. More particularly, it relates to modifying the process of forming dispersed clays therein. Still more particularly, the invention relates to the modification of clay dispersion in a phosphate matrix by adding thereto an acid solution prior to significant dispersed clay generation, e.g., prior to washing or classification, thereby significantly improving the sedimentation/consolidation characteristics of the phosphatic clay generated from the matrix.

PRIOR ART

Phosphate matrix, large deposits of which are found in central Florida, is found largely in deposits averaging about 20 feet in thickness, beginning about 15 feet below the surface of the earth. The matrix is mined by open-pit methods.

The matrix comprises clay, quartz sand and phosphate. The clay predominately comprises particles of less than one micron in size. The matrix, after being taken from the ground by drag lines, is dropped into an open pit dug in the surface of the overburden, slurried with high pressure water, and transported to the plant for beneficiation.

During hydraulic slurrying, washing, screening and classification, the clay in the matrix is broken up and well dispersed in the water, producing the common phosphatic clay. There have been many attempts to coagulate phosphatic clays and to salvage the phosphate values present therein. Such attempts include mechanical methods, for example, U.S. Pat. No. 3,008,575 and chemical methods, for example, U.S. Pat. No. 3,314,537. These methods, though, have operated on the clays after they are dispersed in water. U.S. Pat. No. 4,194,969 discloses a method for modifying the formation of phosphatic clays wherein there is added to the matrix prior to any beneficiation an electrolyte solution which is a salt containing a metal ion. Preferably in that disclosure the metal of the water soluble salt is multivalent, that is, it has a valence greater than 1.

OBJECT OF THE INVENTION

A principal object of this invention is to employ a method which substantially modifies phosphatic clay dispersions such that the resulting clays settle rapidly to a higher than normal final density. This permits use of lower walled dams for phosphatic clay storage and enables earlier reclamation of the land dammed to retain the clay dispersions.

SUMMARY OF THE INVENTION

In accordance with the invention there is provided a method for modifying the formation of phosphatic clays during beneficiation of phosphate matrix, the method comprising dispersing the matrix with a dilute solution of an acid selected from the group consisting of short chain organic acids, polybasic acids, and mineral acids and mixtures of these acids.

DESCRIPTION OF THE DRAWINGS

FIG. 1 shows the beneficial effect of using a short chain acid such as acetic acid in the method of this invention.

FIG. 2 shows the beneficial effect of using a polybasic acid, maleic acid.

FIG. 3 shows the beneficial effect of using a mineral acid.

DESCRIPTION OF SPECIFIC EMBODIMENTS

The object of this invention is accomplished by dispersing the phosphate matrix containing the clay in a dilute solution of the above-mentioned acids prior to screening, sizing and other beneficiation operations.

The acids that are used in the process of this invention include the short chain organic acids, polybasic acids, and mineral acids. The short chain organic acids include formic acid, acetic acid and propionic acids. The polybasic acids include oxalic succinic, malonic and, maleic acid, and the mineral acids include nitric, sulfuric and hydrochloride acids. Of these, the most preferred are acetic and nitric acids. It is, of course, possible to use mixtures of any of the acids noted above.

We have found that the effective concentration of acid in the water solution used to obtain the benefits of this invention is preferably from about 0.1–10 pounds of acid per ton of dry matrix.

In the process of this invention the matrix after strip mining is slurried with an aqueous solution of the particular acid to be used with the help of a high speed jet. The matrix slurry is pumped to the beneficiation plant through a pipeline. In the plant the slurry first goes through the conventional screening, washing, sizing and clarification steps. The dispersed phosphatic clays obtained from these steps are sent to a clay pond for settling in the conventional manner and the supernatant water recovered from the settling operation is recycled.

Optionally the matrix can be moved to the plant by a conveyor and dispersed in an acid solution in the beneficiation plant prior to the washing/screening step.

The examples which follow were performed on samples obtained from the Florida phosphate fields. They illustrate the effectiveness of the various acids of this invention in modifying phosphatic clay to produce improved consolidation. In these particular cases the treatments were tested on a typical phosphate matrix from Fort Meade, Fla., containing 69% by weight of solids.

EXAMPLE 1

This example illustrates the application of the invention using short chain organic acids.

Figure 1:
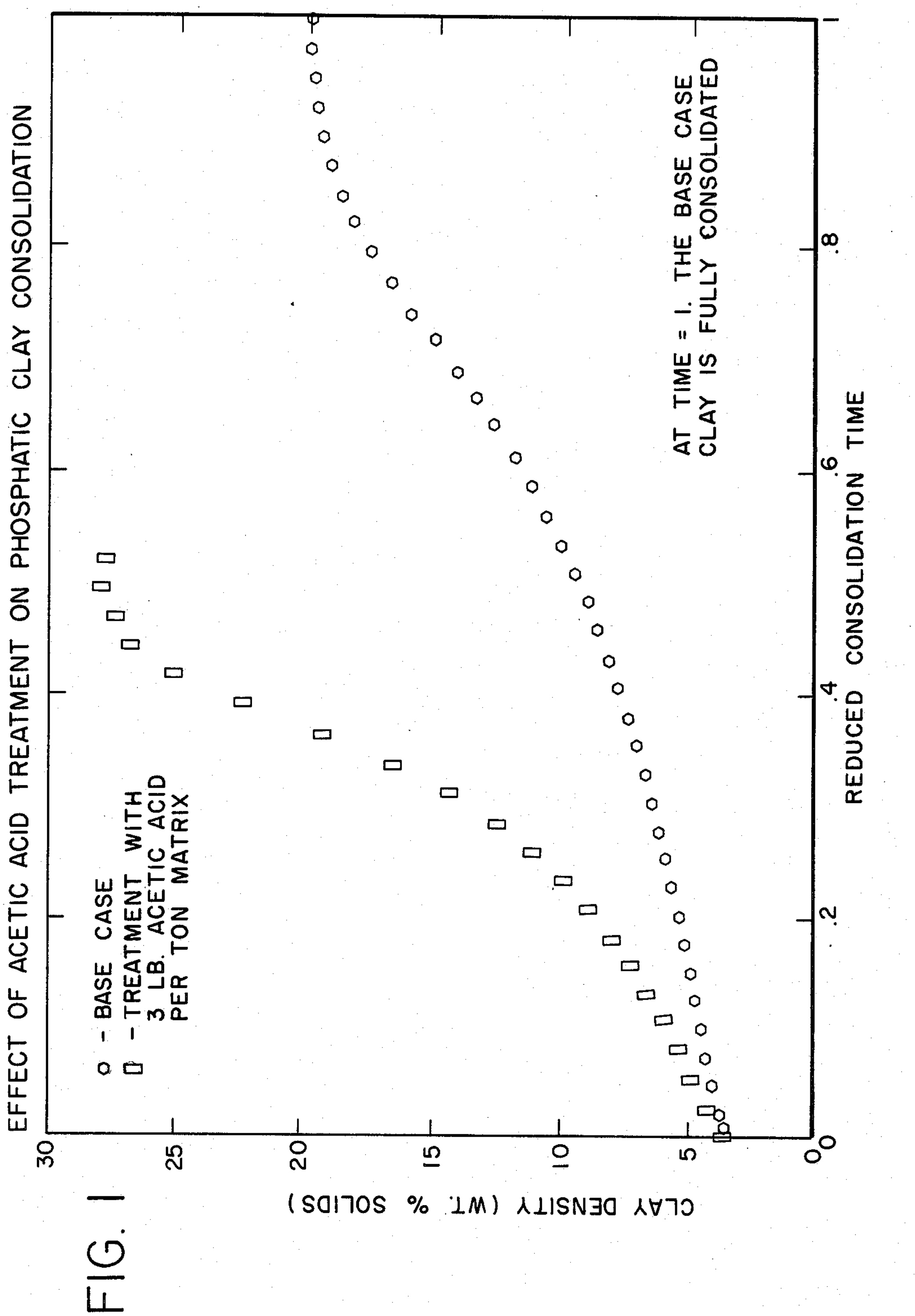
FIGS. 1 to 3 are graphs summarizing the experimental work involving the three kinds of acids cited above.

The matrix was slurried at a concentration of 40 weight percent of solids in water in which acetic acid had been previously dissolved to give a loading of 3 pounds of acetic acid per ton of dry matrix. The resulting slurry was subjected to high shear conditions (to simulate field operation). The slurry was then screened at 150 mesh, the underflow being collected to supply a simulated phosphatic clay. This material was diluted to $3\frac{1}{2}$ weight percent solids. The resulting phosphatic clay slurry was then consolidated in a laboratory consolidometer under an effective stress of 0.21 psi. A base case comparison clay slurry was also prepared from the same matrix following the procedure described above except that no acid was added to the water used to make up the original matrix slurry. The respective consolidation curve for each of the two samples is plotted in FIG. 1. The acid treatment increased the clay consolidation rate by 180 percent and the final clay consolidation density by 8 weight percent solids from 20 to 28 weight percent.

EXAMPLE 2

Figure 2:
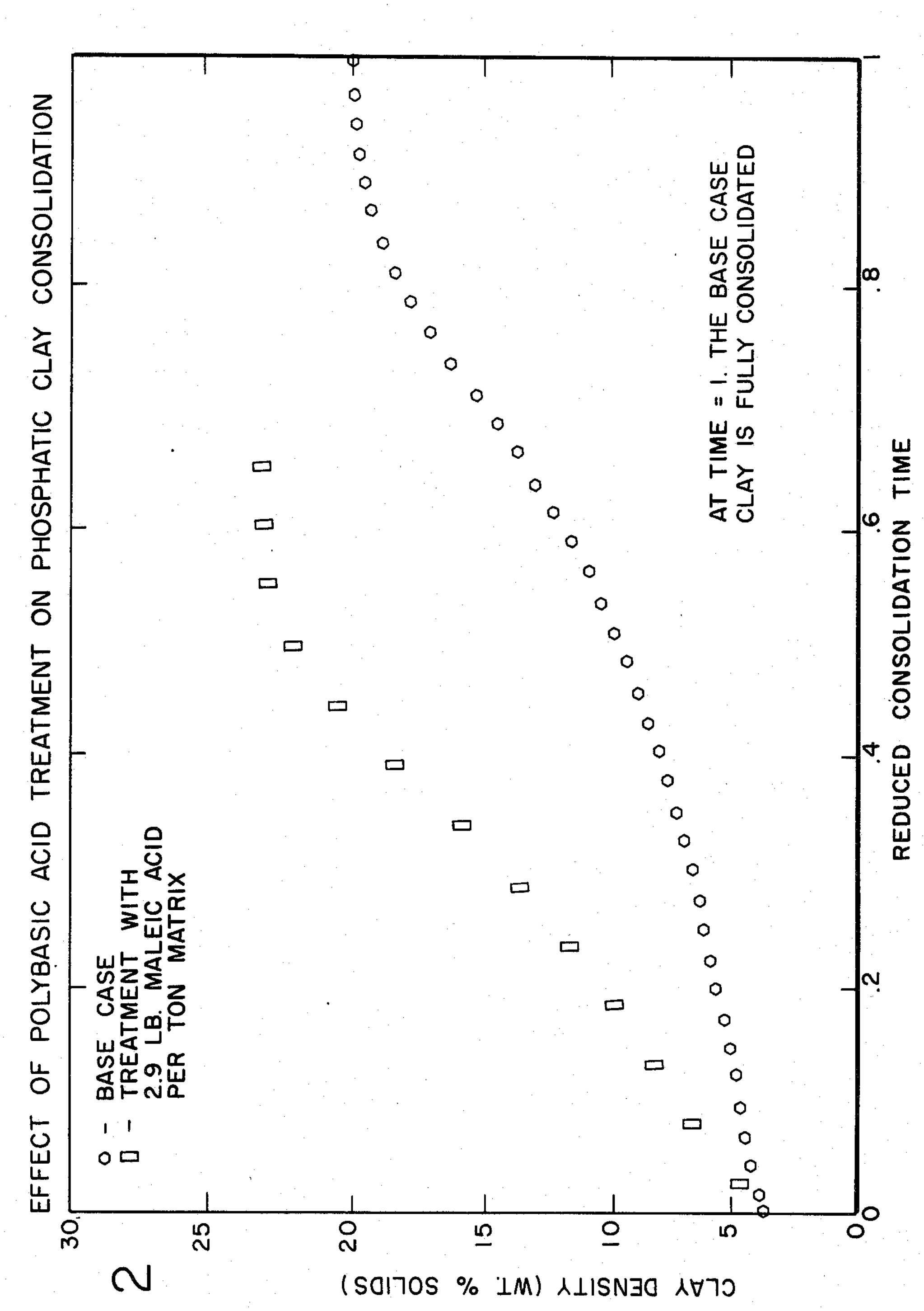

In this test the acidifying agent was maleic acid, an example of a polybasic acid. A sample of the same phosphate matrix as that described in Example 1 was slurried at 40 weight percent of solids in water containing 2.9 pounds of maleic acid per ton of dry matrix. The slurry was again subjected to high shear conditions to simulate field operation. A simulated phosphatic clay waste was obtained by screening the slurry at 150 mesh, as in Example 1, collecting the underflow and diluting it to 3.5 weight percent solids. The resulting phosphatic clay slurry was consolidated in the laboratory under an effective stress of 0.21 psi. The results of this consolidation test are shown in FIG. 2 compared with the base case slurry tested in Example 1. The maleic acid treatment increased the clay consolidation rate by 270 percent and increased the final clay density by 3.3 weight percent.

EXAMPLE 3

Figure 3:
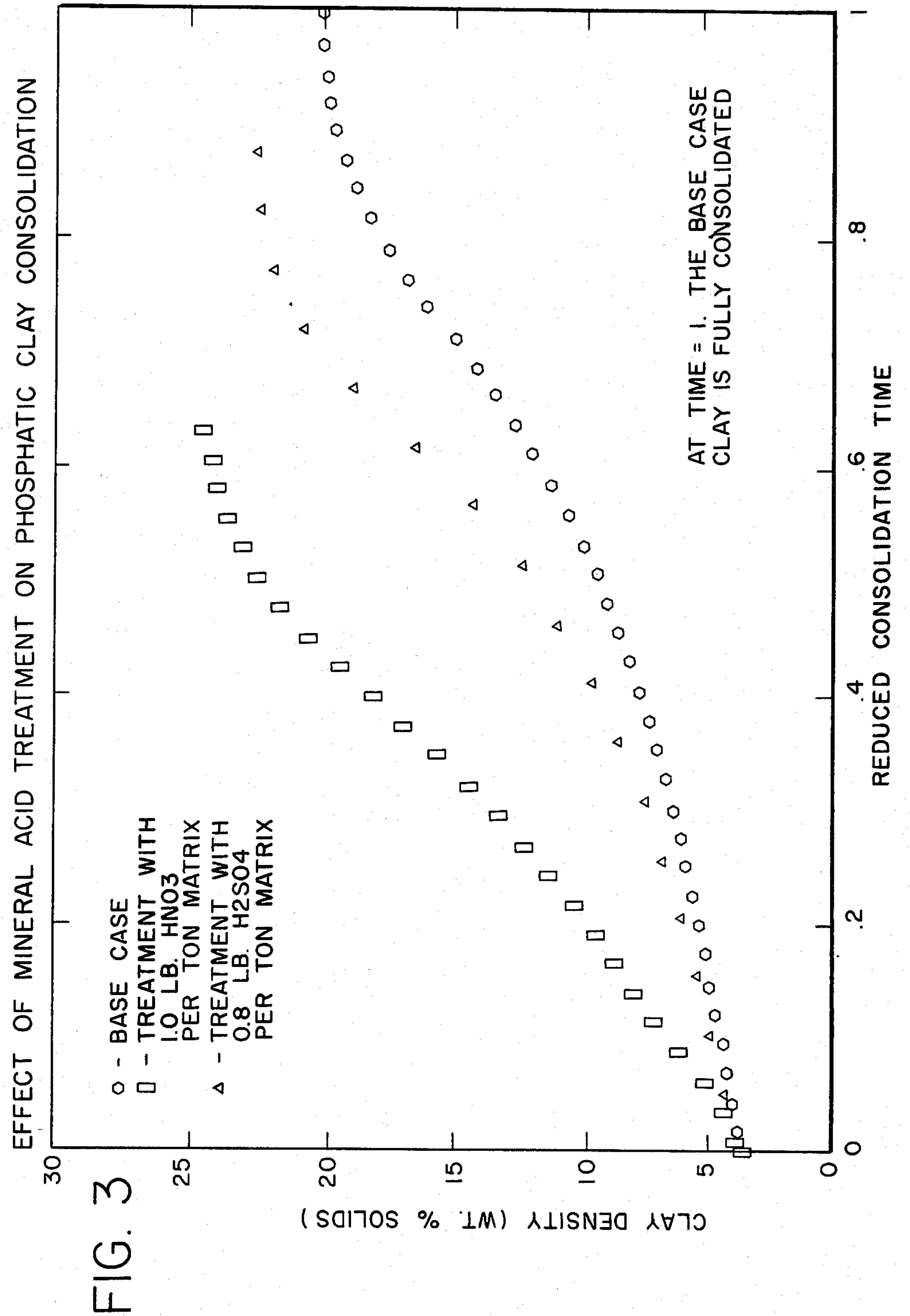

A test similar to that in Examples 1 and 2 was conducted using nitric acid as an example of a mineral acid. Laboratory test conditions were the same as in Examples 1 and 2 except that 1.0 pounds of nitric acid per ton of dry matrix was utilized. The above procedure was also repeated using 0.8 pounds of sulfuric acid per ton of dry matrix. The consolidation characteristics of these two clay slurries were compared with those of the base case phosphatic clay slurry of Example 1. FIG. 3 shows the respective consolidation curves for each of these two phosphatic clays. The nitric acid treatment increased the clay consolidation rate by 270 percent and increased the final clay density by 4.5 weight percent. The sulfuric acid treatment increased the clay consolidation rate by 40 percent and increased the final clay density by 2.6 weight percent.

From the foregoing examples it is readily apparent that treatment of the matrix with an aqueous solution of acid prior to the beneficiation process dramatically improves the consolidation characteristics of the phosphatic clay generated from the matrix during phosphate beneficiation.

We claim:

1. A method for substantially improving the consolidation characteristics of phosphatic clays generated in phosphatic beneficiation, comprising:

(a) adding to an as-mined matrix phosphate, prior to washing or classification, an aqueous solution of an acid selected from the group consisting of short chain organic acids, polybasic acids, mineral acids, and mixtures thereof, the concentration of acid added being between about 0.1 and about 10 pounds per ton of dry matrix phosphate; and (b) subsequently washing or classifying the resultant aqueous solution containing matrix phosphate.

2. The method of claim 1 wherein the acid is a short chain organic acid selected from the group consisting of formic, acetic acid, and propionic acids.

3. The method of claim 1 wherein the acid is a polybasic acid selected from the group consisting of oxalic, maleic, succinic, and malonic acids.

4. The method of claim 1 wherein the acid is a mineral acid selected from the group consisting of nitric, sulfuric acids, and hydrochloric acids.

5. The method of claim 1 wherein the acid is acetic acid.

6. The method of claim 1 wherein the acid is maleic acid.

7. The method of claim 1 wherein the acid is nitric acid.

8. The method of claim 1 wherein the acid is sulfuric acid.

* * * * *